US012772223B2

(12) United States Patent
Guo et al.

(10) Patent No.: US 12,772,223 B2
(45) Date of Patent: Oct. 20, 2026

(54) HARMONIC CHANNEL DETECTION AND PREVENTION

(71) Applicant: HEWLETT PACKARD ENTERPRISE DEVELOPMENT LP, Spring, TX (US)

(72) Inventors: Yongchang Guo, Beijing (CN); Xuguang Jia, Beijing (CN); Qiang Zhou, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 758 days.

(21) Appl. No.: 18/306,459

(22) Filed: Apr. 25, 2023

(65) Prior Publication Data

US 2024/0365300 A1 Oct. 31, 2024

(51) Int. Cl.

| | |
|---|---|
| ***H04W 72/0453*** | (2023.01) |
| ***H04L 1/1607*** | (2023.01) |
| ***H04L 5/00*** | (2006.01) |
| ***H04W 72/044*** | (2023.01) |

(52) U.S. Cl.

CPC ....... *H04W 72/0453* (2013.01); *H04L 1/1642* (2013.01); *H04L 5/0048* (2013.01); *H04W 72/0473* (2013.01)

(58) Field of Classification Search

None

See application file for complete search history.

(56) References Cited

U.S. PATENT DOCUMENTS

| | | | | |
|---|---|---|---|---|
| 7,289,961 | B2 | 10/2007 | Bocko et al. | |
| 7,596,459 | B2 | 9/2009 | Swarztrauber et al. | |
| 8,958,371 | B2 | 2/2015 | Gaal et al. | |
| 9,401,153 | B2 | 7/2016 | Sharma et al. | |
| 9,713,099 | B2 | 7/2017 | Emmanuel et al. | |
| 10,334,600 | B2 | 6/2019 | Lim et al. | |
| 2004/0161062 | A1 * | 8/2004 | Richey ................ | H03M 1/0614 375/316 |
| 2007/0019584 | A1 * | 1/2007 | Qi ......................... | H04W 36/04 455/432.1 |
| 2010/0173586 | A1 * | 7/2010 | McHenry ............. | H04W 16/14 455/62 |

(Continued)

FOREIGN PATENT DOCUMENTS

EP 2757852 A1 7/2014

*Primary Examiner* — Steve R Young

(74) *Attorney, Agent, or Firm* — Hewlett Packard Enterprise Patent Department

(57) ABSTRACT

A method for harmonic channel detection is provided. The method comprises receiving, by a first AP working on a first channel, a beacon frame transmitted by a second AP and parsing the beacon frame to obtain information of a second channel indicated in the beacon frame. The method further comprises determining a plurality of candidate harmonic channels and validating that the second channel is one of the candidate harmonic channels. In addition, the method further comprises validating that the beacon frame is transmitted on the second channel based on a sequence number and a TBTT indicated in the beacon frame and discarding the beacon frame. Implementations of the present disclosure can reduce harmonic frames from being reported to a controller at upper layer, and improve the performance of the network.

18 Claims, 11 Drawing Sheets

(56) References Cited

U.S. PATENT DOCUMENTS

| | | | | |
|---|---|---|---|---|
| 2015/0063323 | A1* | 3/2015 | Sadek | H04W 56/001 370/336 |
| 2015/0163769 | A1* | 6/2015 | Lee | H04W 24/02 370/329 |
| 2015/0304810 | A1* | 10/2015 | Jalali | G06K 7/10009 370/336 |
| 2017/0055272 | A1* | 2/2017 | Bando | H04W 72/02 |
| 2018/0234227 | A1* | 8/2018 | Zhang | H04L 27/26 |
| 2019/0088367 | A1 | 3/2019 | Stamatopoulos et al. | |
| 2019/0192047 | A1 | 6/2019 | Stamatopoulos et al. | |
| 2019/0320385 | A1* | 10/2019 | Bhartia | H04W 48/06 |
| 2021/0051118 | A1* | 2/2021 | Wang | H04L 49/9015 |
| 2021/0090535 | A1 | 3/2021 | Miles et al. | |
| 2021/0235286 | A1* | 7/2021 | Jeuk | H04W 48/08 |
| 2022/0167133 | A1* | 5/2022 | Kraeling | H04W 76/10 |
| 2022/0418022 | A1* | 12/2022 | Kneckt | H04W 36/06 |
| 2023/0198582 | A1* | 6/2023 | Hong | H04B 7/024 375/262 |

* cited by examiner

HARMONIC CHANNEL DETECTION AND PREVENTION

BACKGROUND

A Wi-Fi access point (AP) may transmit beacon frames periodically. A beacon frame may include information on the AP, such as a basic service set identifier (BSSID), a working channel, a beacon interval, a sequence number, etc. During the passive scanning, the AP may receive beacon frames transmitted by other APs working on the same channel. When the AP receives beacon frames transmitted by other APs working on the same channel, the AP may learn the information of the other APs and may change its parameters in order to improve its performance.

When the AP receives a beacon frame during the passive scanning and the channel indicated in the beacon frame is different from the working channel of the AP, the beacon frame may be handled as an attack frame. In some cases, a scanning algorithm may be impacted adversely.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

Figure 1:
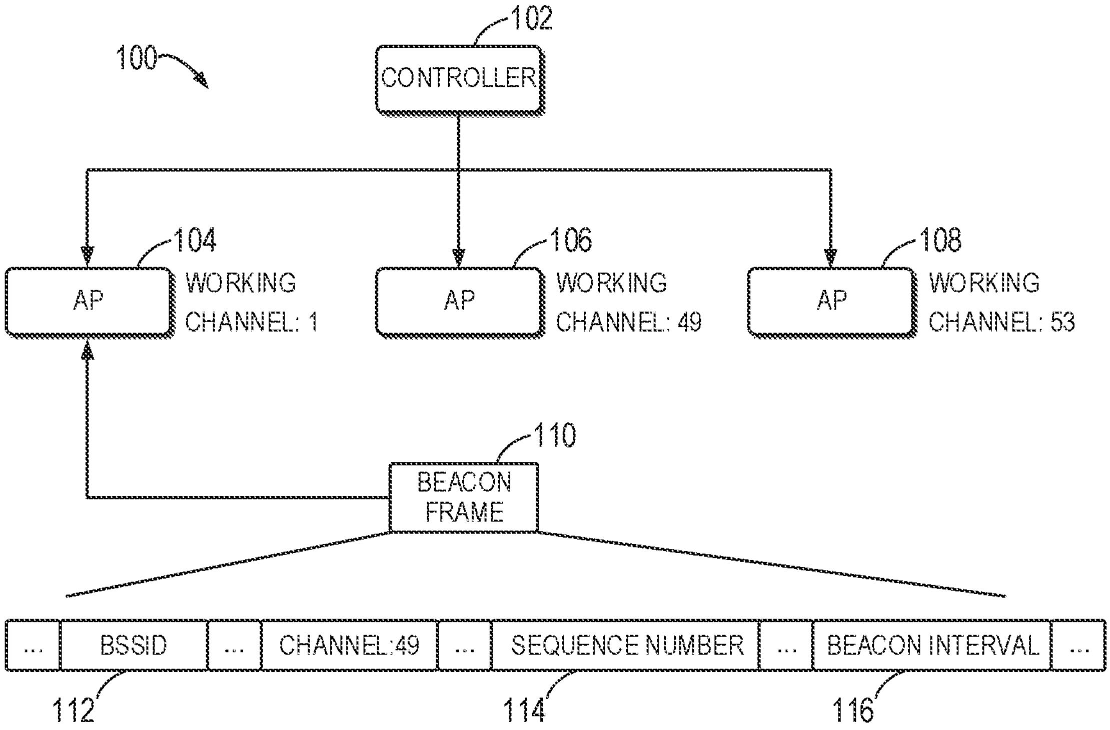
FIG. 1 illustrates an example environment in which example implementations of the present disclosure may be implemented.

As discussed above, a current AP may receive beacon frames from one or more other APs during the passive scanning. Generally, the channels indicated in the received beacon frames are the same as the working channel of the current AP. However, in some situations, the channels indicated in the received beacon frames are different from the working channel of the current AP. In some cases, the frames may be attack frames transmitted by an attacker. Current AP may report these frames to a controller for analysis. In some cases, the frames may be harmonic frames transmitted by other APs that working on other channels.

If the current AP receives a frame transmitted by another AP working on another channel, then the frame transmitted by the other AP is referred to as a harmonic frame, and the channel is referred to as a harmonic channel. Harmonic frames are caused by aliasing occurring during the signal sampling, and aliasing is a phenomenon that highly influences the digital signal processing area. Aliasing is the effect of overlapping frequency components resulting from an insufficiently large sampling rate. The sampling theorem specifies the minimum sampling rate at which a continuous-time signal needs to be uniformly sampled so that the original signal can be completely recovered or reconstructed by these samples alone. Particularly, in the Wi-Fi scenario, the sampling rate needs to be at least twice the scan channel bandwidth, such that the original signal may be completely reconstructed. Otherwise, aliasing occurs when the sampling rate is insufficiently large. However, increasing the sampling rate leads to expensive storage costs and computing costs. Therefore, some chip vendors take triple of channel bandwidth as the sampling rate. Thus, harmonic frame caused by aliasing commonly exists in the real world.

Traditional APs report all captured frames to an upper layer without any filtering, such that harmonic frames may be reported unexpectedly during AP scanning. If an AP reports harmonic frames to its upper layer, then the logic and decision of the upper layer controller may be impacted adversely. In some examples, harmonic frames may be handled as attack frames, and this causes a normal BSSID may be treated as an attacker. Such harmonic frames may come from channels far away from the current channel. Harmonic frames frequently occur, especially in 6G bands, since 6G bands have a large frequency range. For example, an AP transmitting beacon frames at 6135 MHZ (channel 37) may capture a frame with a weak signal at 6375 MHZ (channel 133). In some examples, scanning algorithms may take BSS/OBSS number as one dimensionality to organize potential scan channel list table. Therefore, if the AP keeps reporting wrong channel information indicated in the harmonic frame, the performance of the scanning feature may be reduced. In some examples, management applications take actions based on information, such as channel utilization and TX power, as indicated by the reported frames. Harmonic frames may be considered normal traffic, and it may result in making wrong decisions by the management applications.

Therefore, implementations of the present disclosure propose a scheme for detecting harmonic channels by an AP and reducing the harmonic impact by a controller based on the harmonic channels. According to implementations of the present disclosure, a current AP is working on a current channel, and receives a frame, and a channel indicated in the frame is different from the current channel. To determine whether the frame is a harmonic frame, the current AP may check that the channel indicated in the frame is a candidate harmonic channel based on the frequency and the bandwidth of the current channel, and may validate that the frame is not a disguised attack frame but is indeed a frame transmitted from the candidate harmonic channel at least based on a sequence number and a target beacon transmission time (TBTT) indicated by the beacon interval in the frame. The current AP then may determine that the frame is a harmonic frame and the channel indicated in the frame is a harmonic channel. Accordingly, the harmonic frame may be discarded by the current AP. In some implementations, information of the harmonic channel may be reported by the current AP to the controller, such that the controller may take actions to improve the performance of the network.

In this manner, harmonic frames will not be reported to a controller at the upper layer, which can prevent normal BSS from being treated as attackers, eliminate adverse effects of harmonic frames on scanning algorithms, and facilitate the controller to make the right decisions. Other advantages of implementations of the present disclosure will be described with reference to example implementations as described below. Basic principles and several example implementations of the present disclosure herein are illustrated with reference to FIG. 1 through FIG. 8 as follows.

FIG. 1 illustrates an example environment 100 in which example implementations of the present disclosure may be implemented. As shown in FIG. 1, there is a controller 102 that manages APs 104, 106, and 108 in an environment 100. In the example environment 100, APs 104, 106, and 108 are working on different channels. For example, the AP 104 is working on channel 1, the AP 106 is working on the channel 49, and the AP 108 is working on channel 53. As shown in FIG. 1, a beacon frame 110 is received by the AP 104. In the beacon frame 110, there are a BSSID 112, a sequence number 114, and a beacon interval 116 (i.e., TBTT), and the channel indicated in the beacon frame 110 is channel 49. In order to determine whether the beacon frame 110 is a harmonic frame, the AP 104 may calculate frequencies of candidate harmonic channels based on the frequency, and the scan channel bandwidth of the AP 104, and only frames transmitted from candidate harmonic channels may be regarded as harmonic frames. For example, when the center frequency of channel 1 is 5955 MHz, and the scan channel bandwidth is 80 MHZ, channels 49, 97, and 145 may be the candidate harmonic channels for channel 1. The details of calculating candidate harmonic channels will be described below. Therefore, frames transmitted by the AP 106, which is working on channel 49, may be harmonic frames for the AP 104. Meanwhile, frames transmitted by the AP 108, which is working on channel 53, are not harmonic frames for AP 104, because channel 53 is not one of the candidate harmonic channels for channel 1.

In order to validate that the beacon frame 110 is not a disguised attack frame, the AP 104 may parse the beacon frame 110 to obtain a sequence number 114 and a beacon interval 116, and may validate the beacon frame at least based on the sequence number 114 and the beacon interval 116. Once the beacon frame 110 is validated, the AP 104 may discard the beacon frame 110 without reporting to the controller 102. In some implementations, the AP 104 may record the BSSID 112 indicated in the beacon frame 110, for example, in a harmonic channel table. When the AP 104 receives a suspect harmonic frame next time, it may check the BSSID indicated in the suspect harmonic frame first and discard the frame without calculating candidate harmonic channels and validating the frame if the BSSID already exists in the harmonic channel table.

Additionally and alternatively, the AP 104 may report its working channel (e.g., channel 1), a harmonic channel (e.g., channel 49), a BSSID of the harmonic frame (e.g., BSSID 112), and information of the AP by which harmonic frame is transmitted (e.g., information of AP 106) to the controller 102. Then, the controller 102 may take some actions to reduce the occurrence of harmonic frames, such that the performance of the network can be improved.

In this manner, harmonic frames can be filtered by the AP 104, such that the AP 104 can avoid changing its parameters by mistakenly determining that its working channel is congested. Furthermore, the performance of a diagnostic system, scanning algorithms, and a management application can be improved.

As described above, the current AP working on a current channel may receive a beacon frame, and the channel indicated in the beacon frame may be different from the current channel. In some implementations, the current AP may check that the signal of the beacon frame is a weak signal. In the case that the signal of the frame is not a weak signal, the frame may be processed in a normal process manner. In some implementations, the current AP may check that the signal strength of the beacon frame is less than a predetermined threshold.

In some implementations, the current AP may check whether the BSSID indicated in the received beacon frame already exists in a harmonic channel table. If the BSSID already exists in the harmonic channel table, the current AP may report the BSSID and the channel indicated in the received beacon frame to a controller, discard the received beacon frame directly, and update the timestamp of a corresponding entry in the harmonic channel table.

In some implementations, the current AP may calculate the frequencies of candidate harmonic channels based on the frequency of the current channel and a scan channel bandwidth for the current AP. Then, the current AP may check that the channel indicated in the received beacon frame is one of the candidate harmonic channels. In these implementations, a frame whose channel is not one of the candidate harmonic channels may not be regarded as a harmonic frame, and the frame may be processed in a normal process manner.

In some implementations, in order to determine that the frame is not a disguised attack frame, the current AP validates that the received beacon frame is transmitted from the channel indicated in the frame based on a sequence number and the TBTT indicated in the frame. In some implementations, the current AP may attempt to capture the same beacon frame as a validation frame on the suspect harmonic channel by scheduling a scan on that channel. Then, the current AP may validate the previously received beacon frame based on the sequence number, and the TBTT indicated in the received beacon frame, the sequence number indicated in the captured validation frame, and the time interval between receiving the beacon frame and capturing the validation frame. In some implementations, the current AP may further check the signal strength of the validation frame, since the current AP may receive frames transmitted from the suspect harmonic channel only when the signal strength of the validation frame is strong enough. In the case that the current AP fails to validate that the received beacon frame is transmitted from the channel indicated in it, the received beacon frame may be processed in a normal processing manner.

Figure 2:
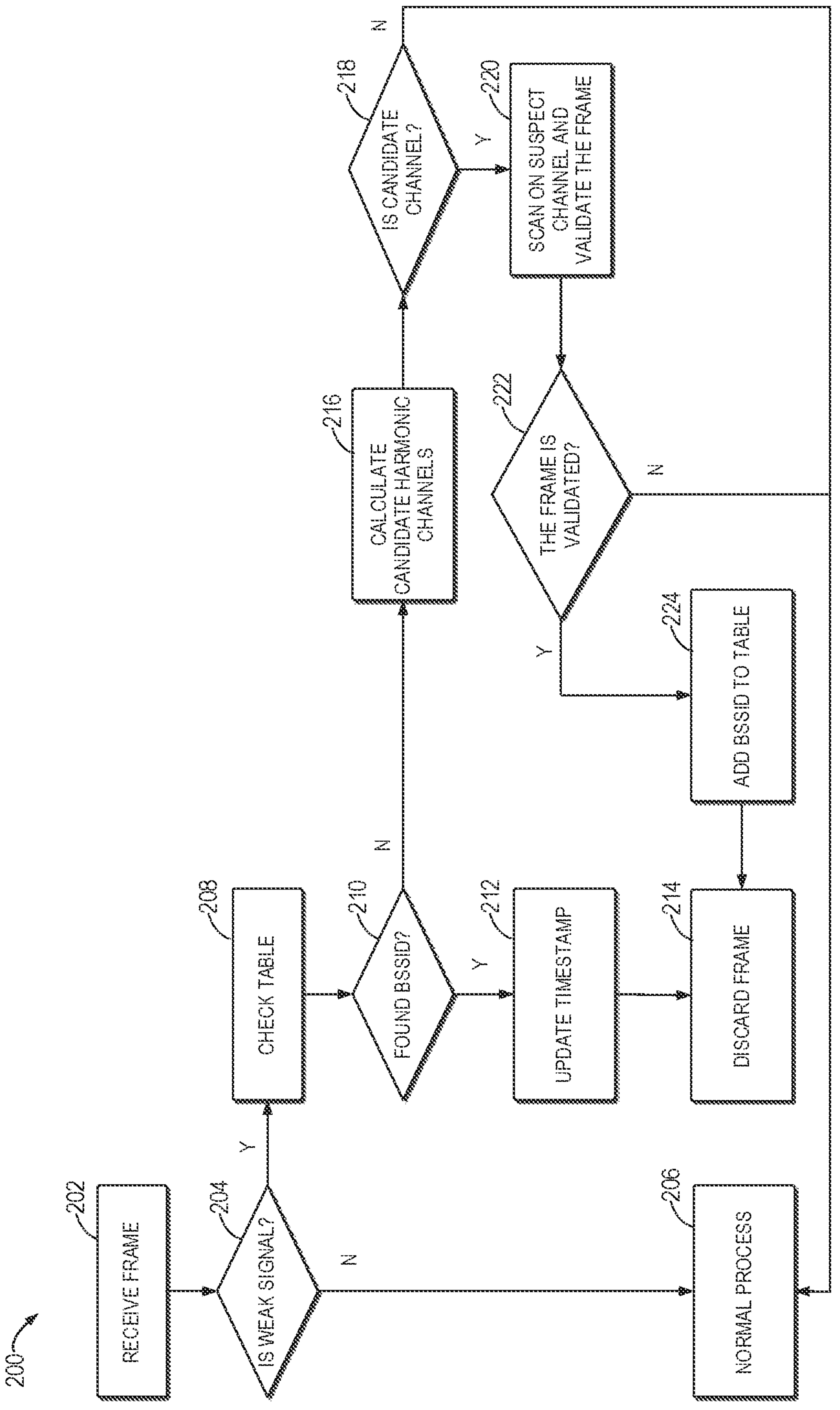
FIG. 2 is a flow chart illustrating an example process for determining whether a received beacon frame is a harmonic frame according to implementations of the present disclosure.

FIG. 2 is a flow chart illustrating an example process 200 for determining whether a received beacon frame is a harmonic frame according to implementations of the present disclosure. At block 202, an AP, for example, the AP 104 in FIG. 1, receives a beacon frame, for example, the beacon frame 110. For example, the AP 104 is working on channel 1, and the channel indicated in the beacon frame 110 is channel 49.

At block 204, the AP 104 checks whether the signal of the beacon frame 110 is a weak signal. Since a harmonic frame is caused by sampling aliases, only weak signals may be harmonic frames. In some implementations, the AP 104 predetermines a threshold for the signal strength of received frames based on the scan channel bandwidth. For example, the threshold may be −80 dB when the scan channel bandwidth is 80 MHz. Then the AP 104 checks whether the signal strength of the beacon frame 110 is less than the predetermined threshold, as shown in equation (1) below:

$$SignalStrength_{beacon-harmonic} \leq \mathrm{Signal}_{Threshold-harmonic-scan-bw} \quad (1)$$

Where $\mathrm{SignalStrength}_{beacon\text{-}harmonic}$ denotes the signal strength of the received beacon frame, and $\mathrm{Signal\ Strength}_{Threshold\text{-}harmonic\text{-}scan\text{-}bw}$ denotes the predetermined threshold for signal strength.

If the beacon frame 110 is not a weak signal, it may not be a harmonic frame, then the process 200 proceeds to block 206. At block 206, the beacon frame 110 may be processed in a normal processing manner. If the beacon frame 110 is a weak signal, then the process 200 proceeds to block 208.

At block 208, the AP 104 checks a harmonic channel table to find whether the BSSID indicated in the beacon frame 110 already exists in the harmonic channel table. For example, the AP 104 checks a harmonic channel table to find whether the BSSID 112 in FIG. 1 already exists in the table. The harmonic channel table is maintained by the AP 104. Each entry of the harmonic channel table may contain at least a detected harmonic channel that a validated harmonic frame transmitted from, the BSSID indicated in the harmonic frame, and a timestamp indicating when this entry is last updated. In some implementations, the AP 104 may check the last updating timestamp in the entries in the harmonic channel table, and delete the entries that have not been updated in a predetermined time period. In other words, the AP 104 may delete an entry if a difference between the last updating timestamp in the entry and a current timestamp (i.e., the timestamp of the checking of the last updating timestamp) is greater than a predetermined threshold. At block 210, if the BSSID 112 already exists in the table, which means that the beacon frame 110 is transmitted from a validated harmonic channel, then the process 200 proceeds to block 212. At block 212, the AP 104 updates the timestamp in the corresponding entry, such that the period of validity for this entry is extended. Then, the process 200 proceeds to block 214. At block 214, the AP 104 discards the beacon frame 110 directly without reporting to the upper layer controller, for example, the controller 102 in FIG. 1.

Return to FIG. 2, if the AP 104 fails to find the BSSID 112 in the harmonic channel table at 210, then the process 200 proceeds to block 216. At block 216, the AP 104 parses the beacon frame 110 to obtain the channel indicated in it. In the example of FIG. 1, the channel indicated in the beacon frame 110 is channel 49. The AP 104 checks whether channel 49 is one of the candidate harmonic channels for channel 1. In some implementations, the AP 104 calculates frequencies of the candidate harmonic channels based on the frequency of its own working channel and its scan channel bandwidth. As described above, harmonic frames are caused by sampling aliases, while the occurrence of sampling aliases is depending on the frequency of the working channel and the sampling rate of AP 104. The sampling rate of AP 104 may be calculated as equation (2) below:

$$SamplingRate_{scan-bw} = N \times ScanBandwidth_{home-channel} \quad (2)$$

Where $\mathrm{SamplingRate}_{scan\text{-}bw}$ denotes the sampling rate of AP $\mathrm{ScanBandwidth}_{home\text{-}channel}$ denotes the scan channel bandwidth of AP, and N denotes a parameter which may be selected by chip vendors. According to the sampling theorem, N should be greater than 2. In some implementations, N may be selected as 3.

In some implementations, the sampling aliases occur at frequencies every sampling rate interval for frequency of the working channel of AP 104. In other words, the frequencies of the candidate harmonic channel may be calculated by adding a non-zero integer multiple of the sampling rate of AP 104 to the frequency of the working channel of AP 104. This may be shown in equation (3) below:

$$f_{harmonic-scan-channel} = f_{home-channel} + i \times SamplingRate_{scan-bw} \quad (3)$$

Where $f_{harmonic\text{-}scan\text{-}channel}$ denotes the frequency of candidate harmonic channel; $f_{home\text{-}channel}$ denotes the frequency of the working channel of AP; and i is a non-zero integer.

Figure 3:
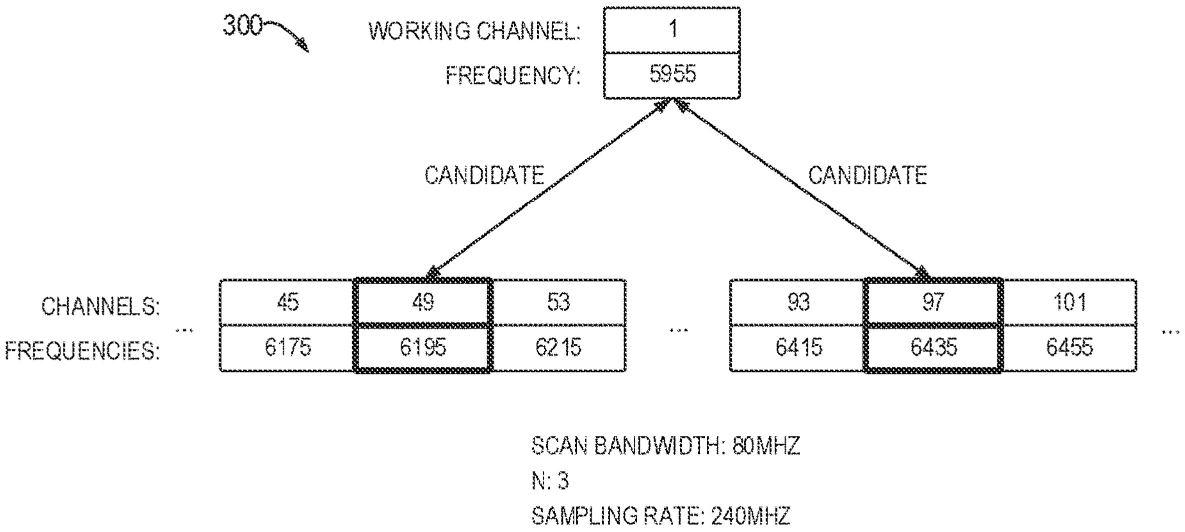
FIG. 3 is a schematic diagram illustrating an example of several candidate harmonic channels for a home channel according to implementations of the present disclosure.

FIG. 3 is a schematic diagram illustrating an example 300 of several candidate harmonic channels for a home channel according to implementations of the present disclosure. As shown in FIG. 3, a working channel of an AP (for example, the AP 104 in FIG. 1) is channel 1. The center frequency of channel 1 is 5955 MHz. When the scan channel bandwidth of AP 104 is 80 MHz, and N is selected as 3, the sampling rate of AP 104 is 240 MHz according to the above equation (2). For the purpose of clarity, example 300 only shows two candidate harmonic channels and channels surrounding them, such as channel 45 (center frequency 6175 MHz), channel 49 (center frequency 6195 MHz), channel 53 (center frequency 6215 MHz), channel 93 (center frequency 6415 MHZ), channel 97 (center frequency 6435 MHz) and channel 101 (center frequency 6455 MHz).

According to the above equation (3), since the center frequency of channel 1 (5955 MHz) plus the sampling rate (240 MHz) is 6195 MHz, which is the center frequency of channel 49, then channel 49 is a candidate harmonic channel for channel 1, but channel 45 and channel 53 are not. Moreover, since the center frequency of channel 1 (5955 MHz) plus double sampling rate (480 MHz) is 6435 MHz, which is the center frequency of channel 97, then channel 97 is also a candidate harmonic channel for channel 1 but channel 93 and channel 101 are not. Although not shown in FIG. 3, channel 145 is also a candidate harmonic channel for channel 1 since the difference value between the center frequency of channel 145 (6675 MHz) with the center frequency of channel 1 (5955 MHz) is triple sampling rate (720 MHz).

In some implementations, the AP 104 may maintain a candidate harmonic channel table in order to avoid calculating frequencies of candidate harmonic channels every time receiving a suspect harmonic frame. The candidate harmonic channel table may contain one or more harmonic channels for each channel. In some implementations, the candidate harmonic channel table may contain only one candidate harmonic channel which is nearest to the home channel, since other candidate harmonic channels are too far away from the home channel such that the signal is too weak to reach the home channel. In this manner, the computing time can be reduced, and the performance for looking up the table can be improved. An example of a candidate harmonic channel table is presented below as Table 1, where the scan channel bandwidth of the AP is 80 MHz, N is 3, and the sampling rate is 240 MHz.

TABLE 1

An example of candidate harmonic channel table

| Channel | Center Frequency | Candidate Harmonic Channel |
|---|---|---|
| 1 | 5955 | 49 |
| 5 | 5975 | 53 |
| 9 | 5995 | 57 |
| . . . | . . . | . . . |

Return back to FIG. 2, after the AP 104 calculated the candidate harmonic channels, the process 200 proceeds to block 218. At block 218, the AP 104 checks whether the channel indicated in the received beacon frame is one of candidate harmonic channels for its working channel. If the channel indicated in received beacon frame is not one of candidate harmonic channels, then the process 200 proceeds to block 206, otherwise the process 200 proceeds to block 220.

At block 220, the AP 104 schedules the scanning on the suspect harmonic channel, and the AP 104 attempts to capture the same beacon frame on the suspect harmonic channel. The same beacon frame may have at least the same BSSID and channel as the received beacon frame. Then, the AP 104 uses the captured beacon frame as validation frame to validate that the received beacon frame is transmitted from the suspect harmonic channel. In some implementations, the AP 104 validates the received beacon frame based on the sequence number and the TBTT indicated in the frame. Beacon frames are transmitted at a regular interval defined as TBTT. Accordingly, the AP which transmitted the suspect harmonic frame should be transmitting beacon frames at the interval of TBTT indicated in the suspect harmonic frame. Each time the AP transmits a beacon frame, the sequence number indicated in the beacon frame is incremented. Therefore, if the time difference between the reception of the suspect harmonic frame and the capture of the validation frame is $\text{Time}_{scan}$, then the sequence number $\text{Seq}_{beacon\text{-}working\text{-}channel}$ indicated in the suspect harmonic frame and the sequence number $\text{Seq}_{harmonic\text{-}beacon\text{-}channel}$ indicated in the validation frame should satisfy a limitation as shown in equation (4) at below:

$$Seq_{beacon-working-channel} = Seq_{harmonic-beacon-channel} - \frac{\text{Time}_{scan}}{TBTT} \quad (4)$$

After the sequence number indicated in the suspect harmonic frame is validated, the suspect harmonic frame may be validated to be a harmonic frame. Correspondingly, the channel indicated in the harmonic frame is a harmonic channel for the working channel of AP 104.

Figure 4:
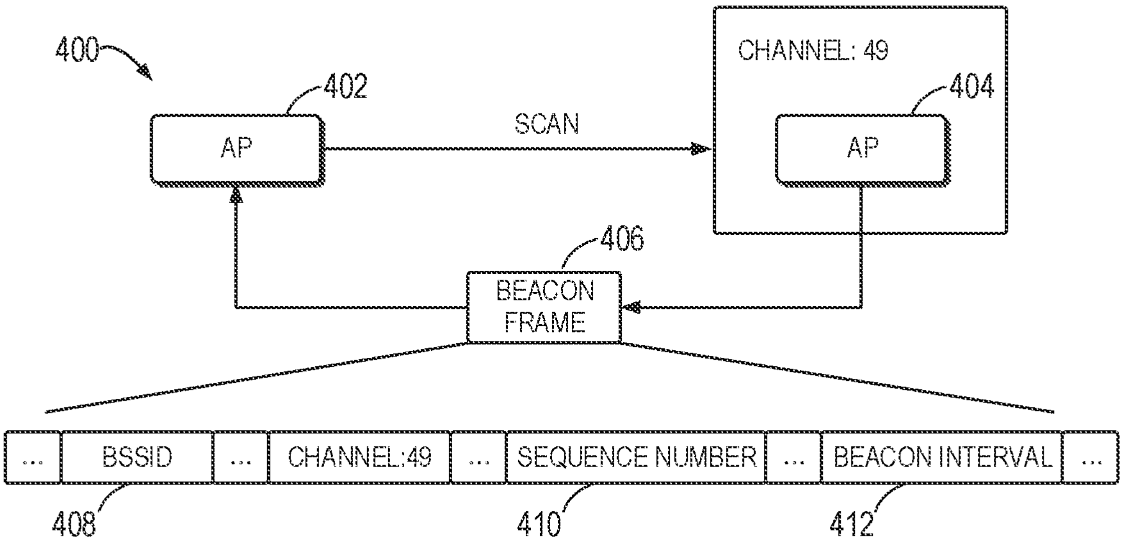
FIG. 4 is a schematic diagram illustrating an example process for scanning on the channel indicated in the received beacon frame according to implementations of the present disclosure.

An example may be described in combination with FIG. 1 and FIG. 4. FIG. 4 is a schematic diagram illustrating an example process 400 for scanning on the channel indicated in the received beacon frame according to implementations of the present disclosure. As shown in FIG. 4, there are AP 402 and AP 404 in the environment. The AP 402 may be the AP 104 in FIG. 1, and the AP 404 may be the AP 106 in FIG. 1. The AP 402 schedules the scanning on channel 49 and attempts to capture the same beacon frame with the beacon frame 110 in FIG. 1. In the example of FIG. 4, the AP 402 captured the beacon frame 406 which is transmitted by the AP 404 working on channel 49. The BSSID 408, the channel, and the beacon interval 412 indicated in the beacon frame 406 are same as the BSSID 112, the channel, and the beacon interval 116 indicated in the beacon frame 110. Therefore, the beacon frame 406 is a validation frame for the beacon frame 110. The AP 402 calculates the time difference between the reception of the beacon frame 110 and the capture of the beacon frame 406. The AP 402 also calculates the difference value between the sequence number 114 and the sequence number 410. The AP 402 further validates that the difference value of sequence numbers matches the beacon frame number that may be transmitted within the time difference. As a result, the beacon frame 110 is validated to be a harmonic frame, and channel 49 is a harmonic channel for channel 1.

In some implementations, the AP 104 may further validate the signal strength of the validation frame, since the current AP may receive frames transmitted from the suspect harmonic channel only when the signal strength of the validation frame is strong enough. In some implementations, the AP 104 may predetermine a threshold for signal strength. Then, the AP 104 may validate that the signal strength of the validation frame is greater than the threshold, as shown in equation (5) below:

$$SignalStrength_{beacon} \geq SignalStrength_{Threshold-beacon-bw} \quad (5)$$

Where $\text{SignalStrength}_{beacon}$ denotes the signal strength of the validation frame and $\text{SignalStrength}_{Threshold\text{-}beacon\text{-}bw}$ denotes the threshold.

For example, in the example of FIG. 4, in order to validate that the signal strength of frames transmitted by AP 404 is strong enough to be received by AP 402 on channel 1, the AP 402 may further validate that the signal strength of the beacon frame 406 is greater than a predetermined threshold.

Return back to FIG. 2, the process 200 determines whether the suspect harmonic frame is validated at block 222. If the AP 104 fails to capture a same beacon frame or the suspect harmonic frame is not validated, then the process 200 proceeds to block 206. Otherwise, if the suspect harmonic frame is validated to be a harmonic frame, then the process 200 proceeds to block 224. At block 224, the AP 104 adds a new entry into the harmonic channel table. The value of BSSID field of the new entry is the BSSID indicated in the harmonic frame, and the value of the last updating timestamp of the new entry is the current timestamp. Then, the process 200 proceeds to block 214, and the harmonic frame is discarded without reporting to the controller.

In the implementations described above, the disclosed methods allow an AP to distinguish harmonic frames from the received abnormal frames. Therefore, the AP can discard these harmonic frames without reporting them to the controller. Thus, the performance of the diagnostic system, scanning algorithms, and the management application can be improved. Furthermore, the disclosed methods utilize a harmonic channel table to reduce calculating candidate harmonic channels and validating the suspect harmonic frames, and thus implementations of the present disclosure allow for reducing the computing time and the resource for detecting harmonic channels.

In some implementations, the AP may report information about harmonic channels to the controller. For example, the information about harmonic channels may include the working channel of the AP, the BSSID of the AP, and the harmonic channel. Accordingly, the controller may collect information about harmonic channels from all of the APs that the controller manages, such that the controller may maintain a harmonic channel list including information about harmonic channels for all channels. Furthermore, the APs receiving harmonic frames may be the harmonic frames generator for neighbor APs as well. Thus, the controller may add these APs to the harmonic channel list also. An example of a harmonic channel list is provided below in Table 2:

TABLE 2

An example of a harmonic channel list

| BSS Channel | Harmonic Channel | BSS | AP |
|---|---|---|---|
| 37 | 85 | BSS 1 | AP a |
| 49 | 97 | BSS 2, BSS 3 | AP b, AP c |
| . . . | . . . | . . . | . . . |
| 85 | 37 | BSS m | AP p |
| 97 | 49 | BSS n | AP q |

In this manner, the controller may utilize this harmonic channel list to optimize the scanning channel list, such that APs may take more scan time to monitor harmonic frames. In addition, the controller can reduce the adverse impact of harmonic frames by utilizing this harmonic channel list.

Implementations of the present disclosure provide several implementations to reduce the adverse impact of harmonic frames by utilizing the harmonic channel list described above. In some implementations, the controller may change the working channels of related APs, in order to reduce surround APs working on harmonic channels. In some implementations, the controller may decrease the transmission (TX) power of the AP, which is transmitting harmonic frames, in order to reduce its impact on the nearby APs. In some implementations, the controller may change the BSS color of related APs, in order to reduce the impact on all surrounding APs. In some implementations, the controller may tune the clear channel assessment (CCA) or the reception (RX) power of the AP, which receives harmonic frames, in order to reduce capturing harmonic frames. In some implementations, some or all of the implementations described above may be implemented in combination.

In some implementations, the controller may change the working channels of related APs. In these implementations, the controller may dynamically change the working channel of the AP which receives harmonic frames, change the working channel of the AP which is transmitting harmonic frames, or change the working channel of both of the related APs. It should be noted that the disclosed method above may be implemented easily when the AP devices are equipped with the same enterprise WLAN. In some cases, the controller may only be able to change the working channel of the AP which receives harmonic frames since the AP which is transmitting harmonic frames is a third-party AP. As a result, the change causes the AP which is transmitting harmonic frames to no longer work on the candidate harmonic channel for the AP which receives harmonic frames.

Figure 5A:
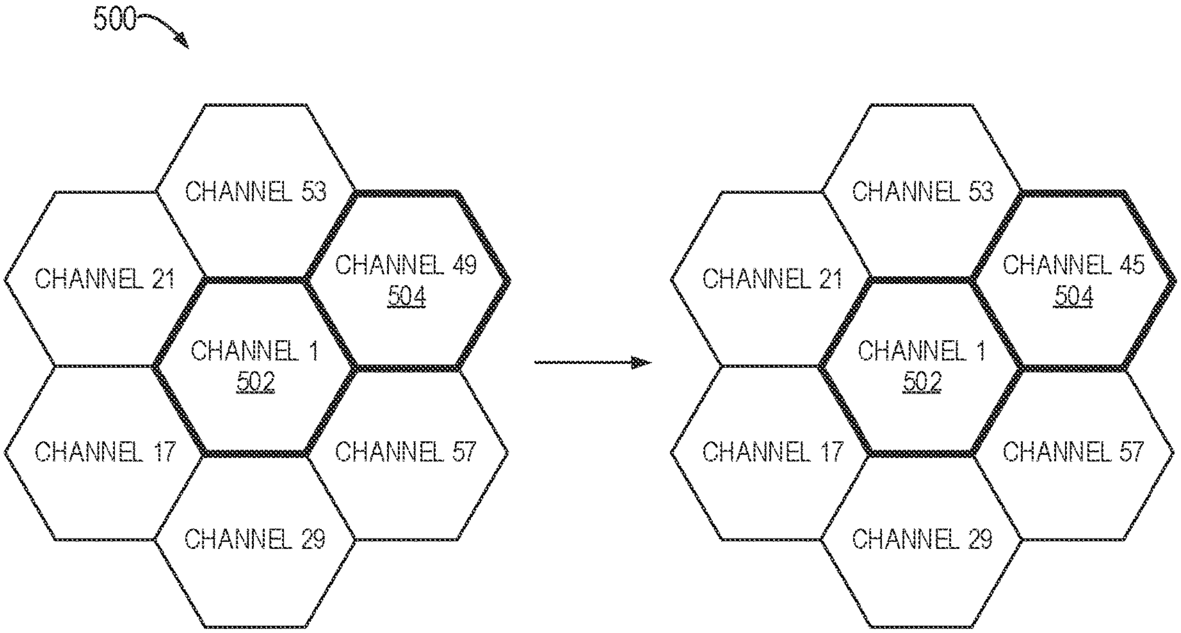
FIG. 5A is a schematic diagram illustrating an example of reducing harmonic frame impact by changing the working channel of AP that is working on a harmonic channel according to implementations of the present disclosure.

FIG. 5A is a schematic diagram illustrating an example 500 of reducing harmonic frame impact by changing the working channel of the AP that is working on the harmonic channel according to implementations of the present disclosure. As shown in FIG. 5A, there are several APs working on channels 1, 17, 21, 29, 49, 53, and 57, respectively. The AP 502 is working on channel 1 (center frequency 5955 MHz), and the AP 504 is working on channel 49 (center frequency 6195 MHz). The AP 502 receives harmonic frames transmitted by the AP 504. In the example 500, the controller changes the working channel of the AP 504 from channel 49 to channel 45 (center frequency 6175 MHz), which is not a candidate harmonic frame for channel 1 according to equation (3). As shown in FIG. 5A, the AP 502 is still working on channel 1, and the AP 504 is working on another channel 45 after the change. In this manner, the implementations provided above reduce harmonic frames by reducing APs surrounding the AP 504 working on harmonic channels.

In some implementations, the controller may decrease the TX power of the AP which is transmitting harmonic frames, such that the AP which receives harmonic frames may no longer receive harmonic frames from the AP that decreased TX power, since the signal strength of the harmonic frames become too weak to reach the AP which receives harmonic frames previously. Hardware measurements show that 68 dB air isolation is required between hardware. Furthermore, AP tests show that harmonic frames may be reduced when APs are 10 meters apart at 18 dB TX power status. In some implementations, the controller may decrease the TX power of both of the related APs, since the AP which receives harmonic frames may be working on a harmonic channel for the AP which is transmitting harmonic frames.

Figure 5B:
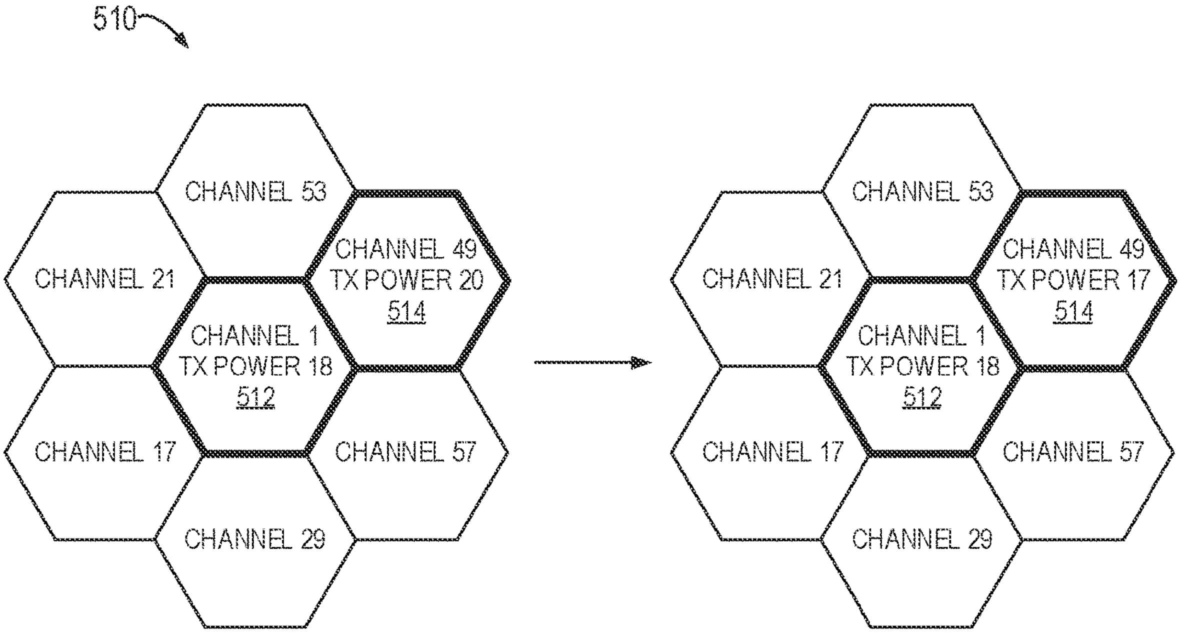
FIG. 5B is a schematic diagram illustrating an example of reducing harmonic frame impact by reducing the transmission power of AP, which is transmitting harmonic frames according to implementations of the present disclosure.

FIG. 5B is a schematic diagram illustrating an example 510 of reducing harmonic frame impact by reducing transmission power of the AP, which is transmitting harmonic frames according to implementations of the present disclosure. As shown in FIG. 5B, there are several APs working on channels 1, 17, 21, 29, 49, 53, and 57 respectively. The AP 512 is working on channel 1 (center frequency 5955 MHZ), and the AP 514 is working on channel 49 (center frequency 6195 MHz). TX power of the AP 512 is 18 dB, and TX power of the AP 514 is 20 dB. The AP 512 receives harmonic frames transmitted by the AP 514. In the example 500, the controller decreases the TX power of the AP 514 from 20 dB to 17 dB. As shown in FIG. 5B, the TX power of the AP 512 is still 18 dB, but the TX power of the AP 514 is reduced to 17 dB after the decrease. Therefore, the signal strength of frames transmitted by the AP 514 is not strong enough to reach the AP 512. In addition, the controller may further decrease the TX power of the AP 512, for example, from 18 dB to 15 dB to prevent the AP 514 from receiving harmonic frames from the AP 512. In this manner, the implementations provided above reduce harmonic frames by reducing the impact of an AP on surrounding APs.

In some implementations, the controller may change the BSS color of related APs. The BSS coloring mechanism assigns different color for BSS (i.e., AP). BSS Coloring is a field that identifies the ID of the BSS. BSSs can be distinguished using the BSS Coloring field when multiple wireless terminals are transmitting on the same channel. In these implementations, the related APs have the same BSS color. The controller may change the BSS color of the AP which receives harmonic frames, change the BSS color of the AP which is transmitting harmonic frames or change the BSS color of both of the related APs. In some cases, the controller may only be able to change the BSS color of the AP which receives harmonic frames since the AP which is transmitting harmonic frames is a third-party AP. As a result, the change causes that the BSS color of related APs are different.

Figure 5C:
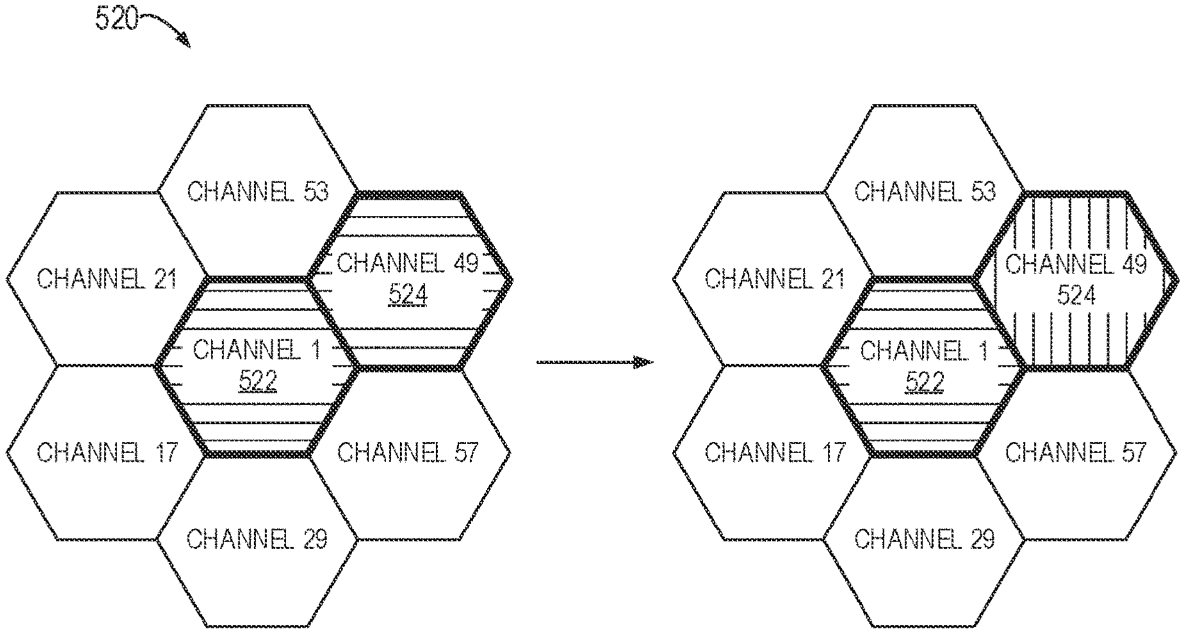
FIG. 5C is a schematic diagram illustrating an example of reducing harmonic frame impact by changing the BSS color of APs according to implementations of the present disclosure.

FIG. 5C is a schematic diagram illustrating an example 520 of reducing harmonic frame impact by changing the BSS color of APs according to implementations of the present disclosure. As shown in FIG. 5C, there are several APs working on channels 1, 17, 21, 29, 49, 53, and 57, respectively. The AP 512 is working on channel 1 (center frequency 5955 MHz), and the AP 514 is working on channel 49 (center frequency 6195 MHz). The AP 522 receives harmonic frames transmitted by the AP 524. The AP 522 and the AP 524 have same BSS color. In the example 520, the controller changes the BSS color of the AP 524. As shown in FIG. 5C, the AP 522, and the AP 524 have different BSS colors after the change. In this manner, the implementations provided above reduce harmonic frames by reducing APs surrounding the AP 524 having the same BSS color as the AP 524.

Furthermore, in some implementations, when the AP transmitting harmonic frame is a third-party, the controller may further tune the RX sensitivity or the CCA sensitivity of the AP which receives harmonic frames, such that harmonic frames are rejected at the PHY level. In some implementations, for HT/VHT capability only AP devices, they have only one CCA set to do such rejection for intra and inter BSS. Therefore, the controller may tune the RX sensitivity of the AP from Min RX Sensitivity to Max RX Sensitivity step by step until harmonic frames can be rejected on the PHY level. The controller may take into account the BSS cover range of the AP while tuning its RX sensitivity.

Figure 6A:
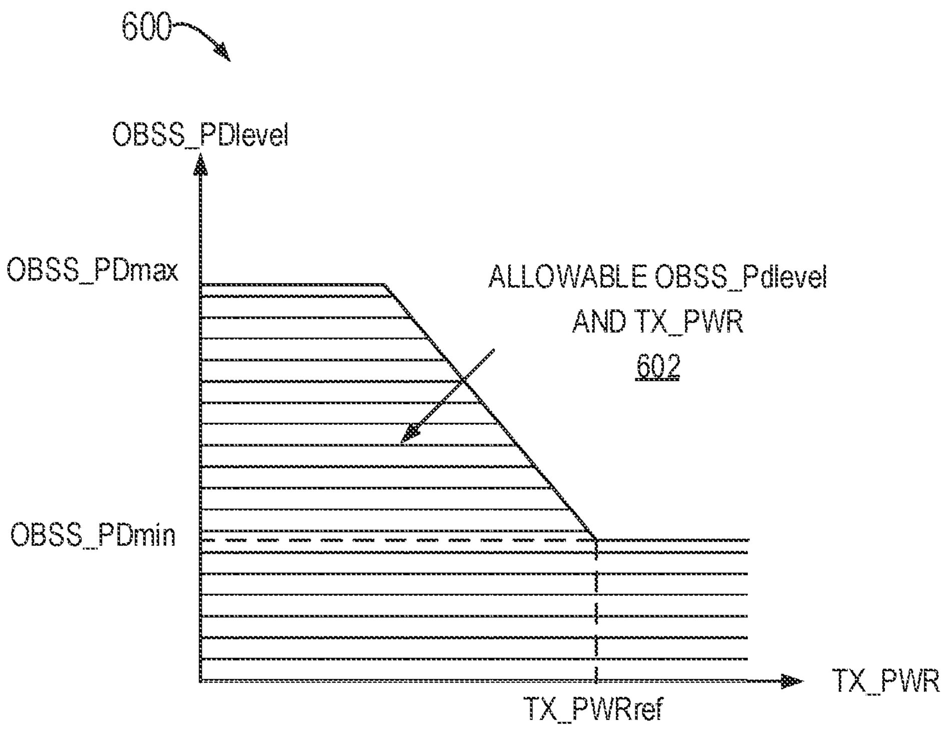
FIG. 6A is a graph illustrating allowable OBSS power detection level and TX power according to implementations of the present disclosure.

In some implementations, for HE/ETH capability AP devices, there are two CCA sets, one is used for intra BSS, and another is used for inter BSS. In these implementations, tuning OBSS power detection threshold (OBSS_PD_THR) is enough when the AP devices use OBSS power detection based spatial reuse. FIG. 6A is a graph denoted as 600, illustrating allowable OBSS power detection level and TX power. According to the Wi-Fi standard, the allowable OBSS power detection level and TX power of AP devices should be within area 602 as shown in FIG. 6A. The controller may add an OBSS power detection offset (OBSS_PD_OFFSET_Harmonic) to the OBSS power detection threshold for harmonic frames. The OBSS power detection threshold for harmonic frames (OBSS_PD_THR_Harmonic) may be calculated as equation (6) below:

$$\text{OBSS\_PD\_THR\_Harmonic}=\text{OBSS\_PD\_THR}+\text{OBSS\_PD\_OFFSET\_Harmonic} \quad (6)$$

Figure 6B:
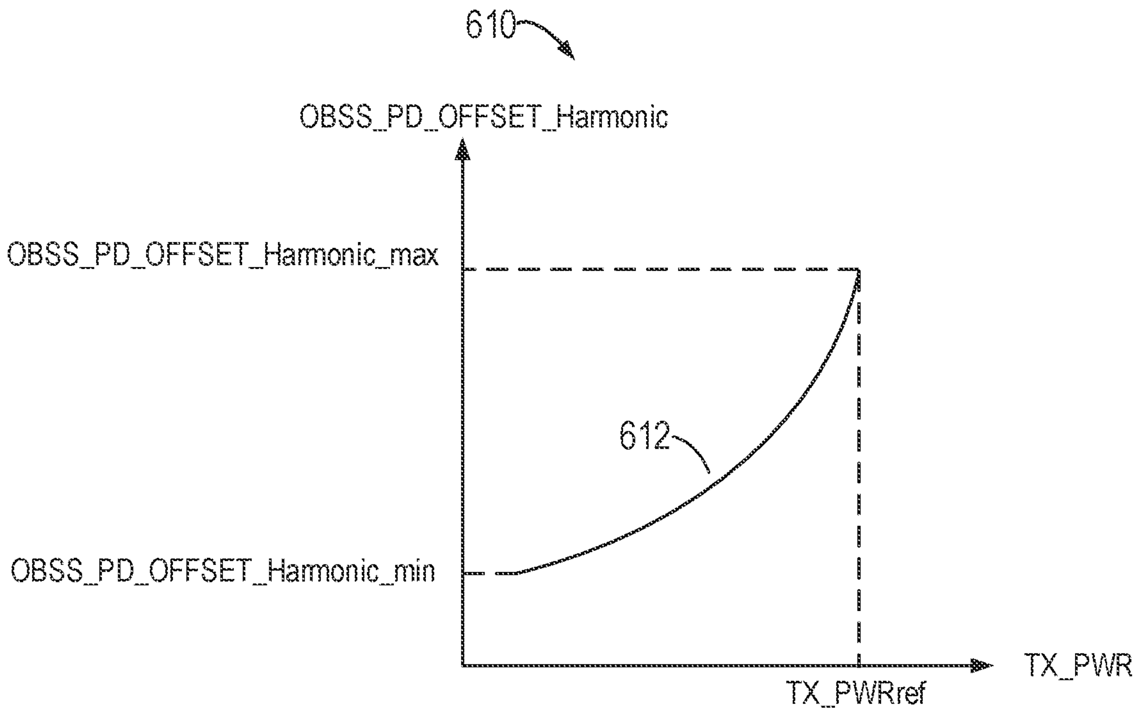
FIG. 6B is a graph illustrating an example of the relationship between OBSS power detection offset for harmonic frames and AP transmission power according to implementations of the present disclosure.

FIG. 6B is a graph denoted as 610, illustrating an example of relationship between OBSS power detection offset for harmonic frames and AP transmission power according to implementations of the present disclosure. As shown in FIG. 6B, the line 612 shows the exponential relationship between TX power and OBSS power detection offset for harmonic frames. TX power reference is a maximum power that can be transmitted. In this manner, the harmonic frames can be rejected at PHY level by tuning RX or CCA sensitivity of AP devices. Therefore, the impact on the uplink and downlink performance caused by harmonic frames can be reduced.

Figure 7:
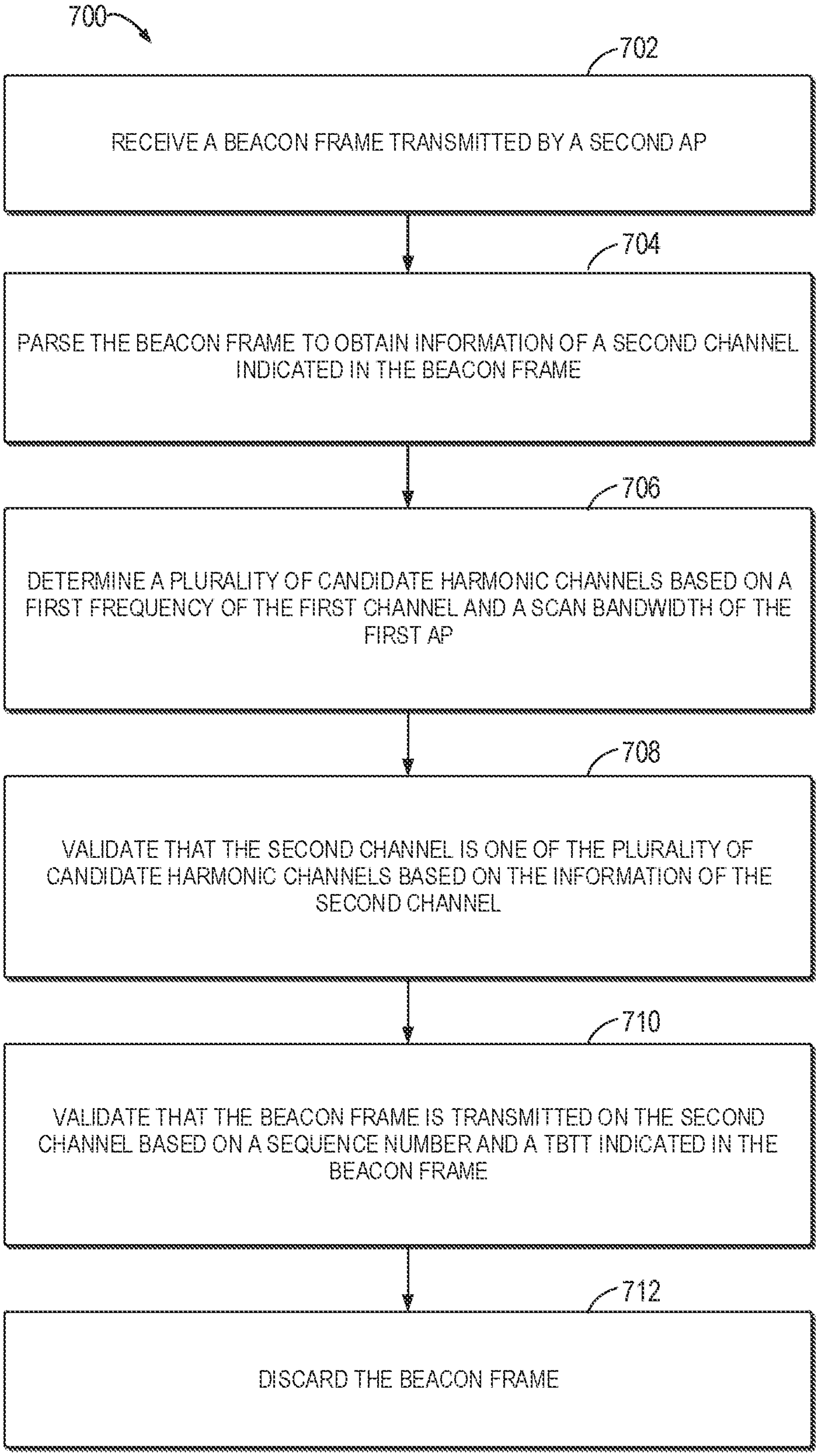
FIG. 7 is a flow chart illustrating a method for harmonic channel detection according to implementations of the present disclosure.

FIG. 7 is a flow chart illustrating a method 700 for harmonic channel detection according to implementations of the present disclosure, the method 700 may be performed by the AP 104 as shown in FIG. 1. As shown in FIG. 7, at block 702, a first AP, which is working on the first channel, receives a beacon frame transmitted by a second AP, which is working on second channel. For example, as shown in FIG. 1, the AP 104 receives beacon frame 110 transmitted by the AP 106. The AP 104 is working on channel 1 and the AP 106 is working on channel 49.

At block 704, the first AP parses the beacon frame to obtain information of the second channel indicated in the beacon frame. For example, the AP 104 parses the beacon frame 110 to obtain channel 49 indicated in the beacon frame 110. In order to reduce reporting harmonic frames to the controller 102, the AP 104 needs to determine whether channel 49 is a candidate harmonic channel for channel 1 and validate whether the beacon frame 110 is indeed transmitted from channel 49.

At block 706, the first AP determines a plurality of candidate harmonic channels based on a first frequency of the first channel and a scan channel bandwidth of the first AP. For example, as shown in FIG. 3, the center frequency of channel 1 is 5955 MHz, and the scan channel bandwidth of the AP 104 is 80 MHz. The AP 104 calculates a plurality of candidate harmonic channels based on the center frequency of channel 1 and the scan channel bandwidth of the AP 104. For example, channel 49 (center frequency 6195 MHz) and channel 97 (center frequency 6435) are two of the candidate harmonic channels.

At block 708, the first AP validates that the second channel is one of the plurality of candidate harmonic channels based on the information of the second channel. For example, as determined at block 706, channel 49 and channel 97 are candidate harmonic channels for channel 1. Thus the channel indicated in beacon frame 110 is validated.

At block 710, the first AP validates that the beacon frame is transmitted on the second channel based on a sequence number and a TBTT indicated in the beacon frame. For example, the AP 104 parses the BSSID 112, the sequence number 114, and the beacon interval 116 in the beacon frame 110. The AP 104 validates that the beacon frame 110 is indeed transmitted on channel 49 by capturing the same beacon frame on channel 49 (e.g., beacon frame 406 in FIG. 4) and validating that difference between the sequence number 114 and the sequence number 410 matches the number of frames transmitted on channel 49 within the time period between the reception of the beacon frame 110 and the capture of the beacon frame 406.

At block 712, the first AP discards the beacon frame. For example, after the validation of beacon frame 110, the AP 104 discards beacon frame 110 without reporting to the controller 102. By discarding the harmonic frames, the AP can prevent them from occupying valuable network resources and causing performance degradation. This allows the AP to focus on delivering high-quality service to legitimate wireless clients, resulting in a more stable and efficient wireless network.

The method 700 disclosed herein can facilitate detecting harmonic frames and harmonic channels. The method 700 can further prevent APs from mistakenly changing their parameters. In addition, the method 700 can make sure that the diagnostic system, scanning algorithms, and management applications work as expected. Therefore, the performance of the network can be improved.

Figure 8:
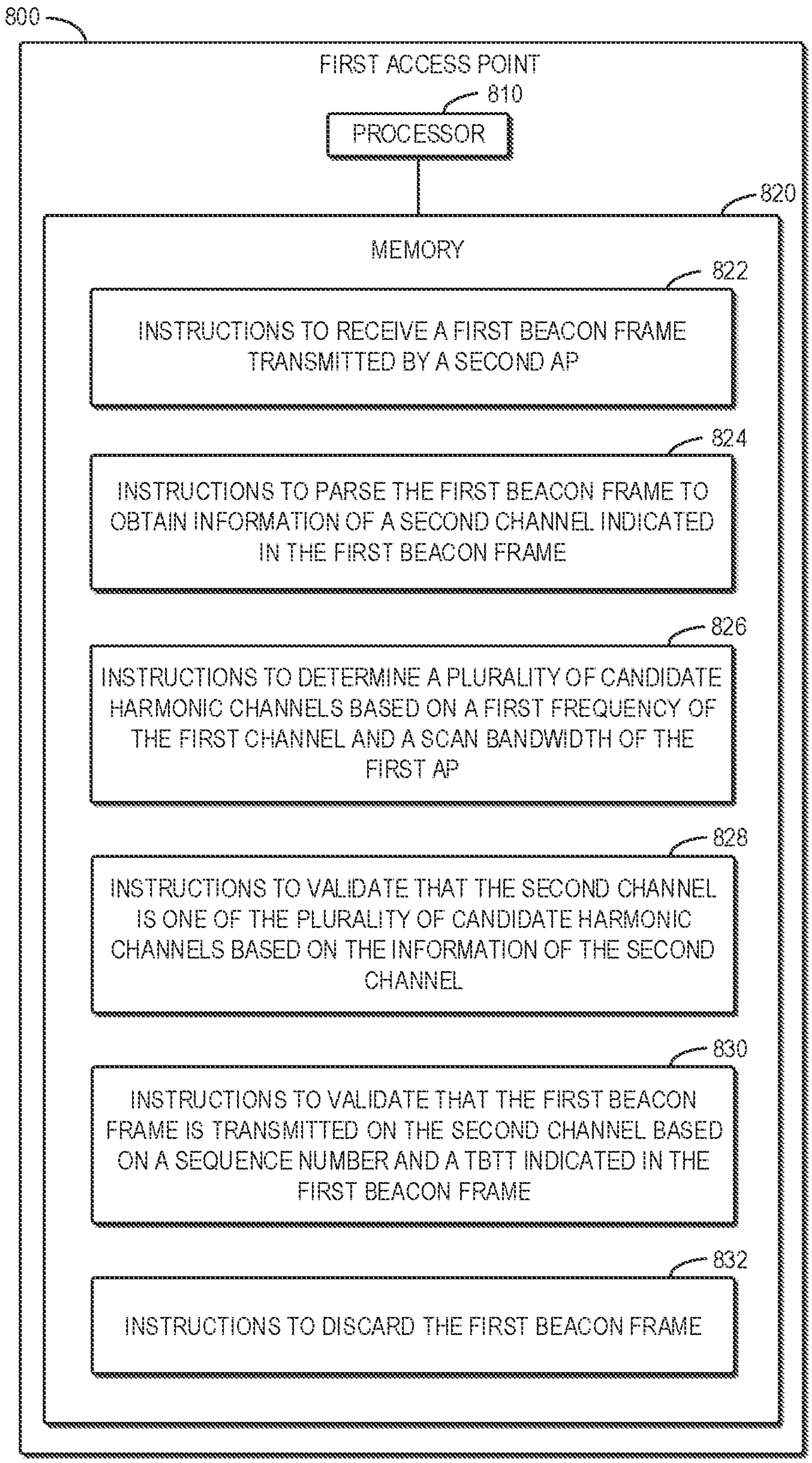
FIG. 8 is a diagram illustrating an example access point according to implementations of the present disclosure.

FIG. 8 illustrates an example first access point 800 according to implementations of the present disclosure. As shown in FIG. 8, the first access point 800 comprises at least one processor 810, and a memory 820 coupled to the at least one processor 810. The memory 820 stores instructions 822, 824, 826, 828, 830, and 832 to cause the processor 810 to perform actions according to example implementations of the present disclosure.

As shown in FIG. 8, the memory 820 stores instructions 822 to receive a first beacon frame transmitted by a second AP. The memory 820 further stores instructions 824 to parse the first beacon frame to obtain information of a second channel indicated in the first beacon frame. The memory 820 further stores instructions 826 to determine a plurality of candidate harmonic channels based on a first frequency of the first channel and a scan channel bandwidth of the first AP. The memory 820 further stores instructions 828 to validate that the second channel is one of the plurality of candidate harmonic channels based on the information of the second channel. The memory 820 further stores instructions 830 to validate that the first beacon frame is transmitted on the second channel based on a sequence number and a target beacon transmission time indicated in the first beacon frame. The memory 820 further stores instructions 832 to discard the first beacon frame.

The stored instructions and the functions that the instructions may perform can be understood with reference to implementations as described above. For brevity, the details of instructions 822, 824, 826, 828, 830, and 832 will not be discussed herein.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:

receiving, by a first access point (AP) working on a first channel, a beacon frame transmitted by a second AP;

parsing, by the first AP, the beacon frame to obtain information of a second channel indicated in the beacon frame;

determining, by the first AP, a plurality of candidate harmonic channels based on a first frequency of the first channel and a scan channel bandwidth of the first AP by:

determining a sampling rate of the first AP based on the scan channel bandwidth of the first AP; and determining frequencies of the plurality of candidate harmonic channels by adding a non-zero integer multiple of the sampling rate of the first AP to the first frequency of the first channel, wherein at least a part of signals transmitted on the plurality of candidate harmonic channels is scanned by the first AP as a result of sampling aliases;

validating, by the first AP, that the second channel is one of the plurality of candidate harmonic channels based on the information of the second channel;

validating, by the first AP, that the beacon frame is transmitted on the second channel based on a sequence number and a target beacon transmission time (TBTT) indicated in the beacon frame; and discarding, by the first AP, the beacon frame.

2. The method of claim 1, wherein the beacon frame transmitted by the second AP is a first beacon frame, and validating that the first beacon frame is transmitted on the second channel based on the sequence number and the TBTT indicated in the first beacon frame comprises:

validating that a signal strength of the first beacon frame is less than a predetermined threshold.

3. The method of claim 2, wherein validating that the first beacon frame is transmitted on the second channel based on the sequence number and the TBTT indicated in the first beacon frame further comprises:

scheduling a scan on the second channel; and receiving a second beacon frame on the second channel, wherein a basic service set identifier and a channel indicated in the second beacon frame are the same as a basic service set identifier and a channel indicated in the first beacon frame.

4. The method of claim 3, wherein validating that the first beacon frame is transmitted on the second channel based on the sequence number and the TBTT indicated in the first beacon frame further comprises:

determining a sequence number difference between the sequence number indicated in the first beacon and a sequence number indicated in the second beacon frame;

determining a number of beacon frames transmitted on the second channel in a time period between the reception of the first beacon frame and the reception of the second beacon frame; and validating that the first beacon frame is transmitted on the second channel based on the sequence number difference and the number of beacon frames.

5. The method of claim 2, wherein validating that the first beacon frame is transmitted on the second channel based on the sequence number and the TBTT indicated in the first beacon frame further comprises:

validating that a signal strength of the second beacon frame is greater than a further predetermined threshold.

6. The method of claim 2, further comprising:

determining that a basic service set identifier indicated in the first beacon frame exists in a harmonic channel table of the first AP;

updating the harmonic channel table with a timestamp of receiving the first beacon frame; and discarding the first beacon frame.

7. The method of claim 1, wherein discarding the beacon frame comprises:

determining that a basic service set identifier indicated in the beacon frame does not exist in a harmonic channel table of the first AP; and adding a new entry into the harmonic channel table of the first AP, wherein the new entry includes the basic service set identifier indicated in the beacon frame and timestamp of the creation of the new entry.

8. The method of claim 7, further comprising:

checking a last updating timestamp in an entry in the harmonic channel table; and in response to determining that a difference between the last updating timestamp in the entry and a timestamp of the checking of the last updating timestamp is greater than a predetermined threshold, deleting the entry from the harmonic channel table.

9. The method of claim 1, further comprising:

receiving, from a controller, an indication to change a working channel of the first AP; and changing the working channel of the first AP according to the indication.

10. The method of claim 9, wherein a transmission power of the second AP is reduced by the second AP in response to receiving another indication from the controller.

11. The method of claim 9, further comprising:

receiving, from the controller, a second indication to change a BSS color of the first AP; and changing the BSS color of the first AP according to the second indication.

12. The method of claim 9, further comprising:

receiving, from the controller, a third indication to tune a reception sensitivity of the first AP; and tuning the reception sensitivity of the first AP according to the third indication.

13. A first access point (AP) comprising:

at least one processor; and a memory coupled to the at least one processor, the memory storing instructions to cause the at least one processor to:

receive a beacon frame transmitted by a second AP;

parse the beacon frame to obtain information of a second channel indicated in the beacon frame;

determine a plurality of candidate harmonic channels based on a first frequency of a first channel on which the first AP working and a scan channel bandwidth of the first AP by:

determining a sampling rate of the first AP based on the scan channel bandwidth of the first AP; and determining frequencies of the plurality of candidate harmonic channels by adding a non-zero integer multiple of the sampling rate of the first AP to the first frequency of the first channel, wherein at least a part of signals transmitted on the plurality of candidate harmonic channels is scanned by the first AP as a result of sampling aliases;

validate that the second channel is one of the plurality of candidate harmonic channels based on the information of the second channel;

validate that the beacon frame is transmitted on the second channel based on a sequence number and a target beacon transmission time (TBTT) indicated in the beacon frame; and discard the beacon frame.

14. The first AP of claim 13, wherein the beacon frame transmitted by the second AP is a first beacon frame, and the instructions to validate that the first beacon frame is transmitted on the second channel based on the sequence number and the TBTT indicated in the first beacon frame further comprise instructions to cause the at least one processor to:

validate that a signal strength of the first beacon frame is less than a predetermined threshold.

15. The first AP of claim 14, wherein the instructions to validate that the first beacon frame is transmitted on the second channel based on the sequence number and the TBTT indicated in the first beacon frame comprise instructions to cause the at least one processor to:

schedule a scan on the second channel; and receive a second beacon frame on the second channel, wherein a basic service set identifier and a channel indicated in the second beacon frame are the same as a basic service set identifier and a channel indicated in the first beacon frame.

16. The first AP of claim 15, wherein the instructions to validate that the first beacon frame is transmitted on the second channel based on the sequence number and the TBTT indicated in the first beacon frame further comprise instructions to cause the at least one processor to:

determine a sequence number difference between the sequence number indicated in the first beacon and a sequence number indicated in the second beacon frame;

determine a number of beacon frames transmitted on the second channel in a time period between the reception of the first beacon frame and the reception of the second beacon frame; and validate that the first beacon frame is transmitted on the second channel based on the sequence number difference and the number of beacon frames.

17. The first AP of claim 14, wherein the instructions to validate that the first beacon frame is transmitted on the second channel based on the sequence number and the TBTT indicated in the first beacon frame further comprise instructions to cause the at least one processor to:

validate that a signal strength of the second beacon frame is greater than a further predetermined threshold.

18. A non-transitory computer-readable medium comprising instructions stored thereon which, when executed by a first access point (AP), cause the first AP to:

receive a beacon frame transmitted by a second AP;

parse the beacon frame to obtain information of a second channel indicated in the beacon frame;

determine a plurality of candidate harmonic channels based on a first frequency of a first channel on which the first AP works and a scan channel bandwidth of the first AP by:

determining a sampling rate of the first AP based on the scan channel bandwidth of the first AP; and determining frequencies of the plurality of candidate harmonic channels by adding a non-zero integer multiple of the sampling rate of the first AP to the first frequency of the first channel, wherein at least a part of signals transmitted on the plurality of candidate harmonic channels is scanned by the first AP as a result of sampling aliases;

validate that the second channel is one of the plurality of candidate harmonic channels based on the information of the second channel;

validate that the beacon frame is transmitted on the second channel based on a sequence number and a target beacon transmission time (TBTT) indicated in the beacon frame; and discard the beacon frame.

* * * * *